No. 821,057. PATENTED MAY 22, 1906.
J. N. PETERSEN.
BALL BEARING.
APPLICATION FILED JULY 9, 1904.
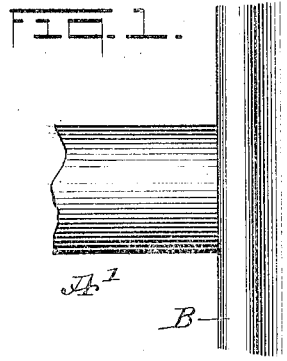
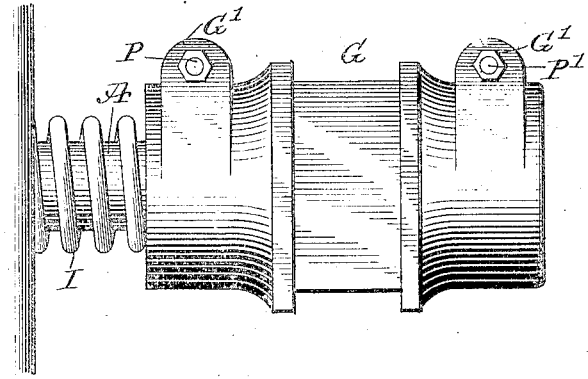
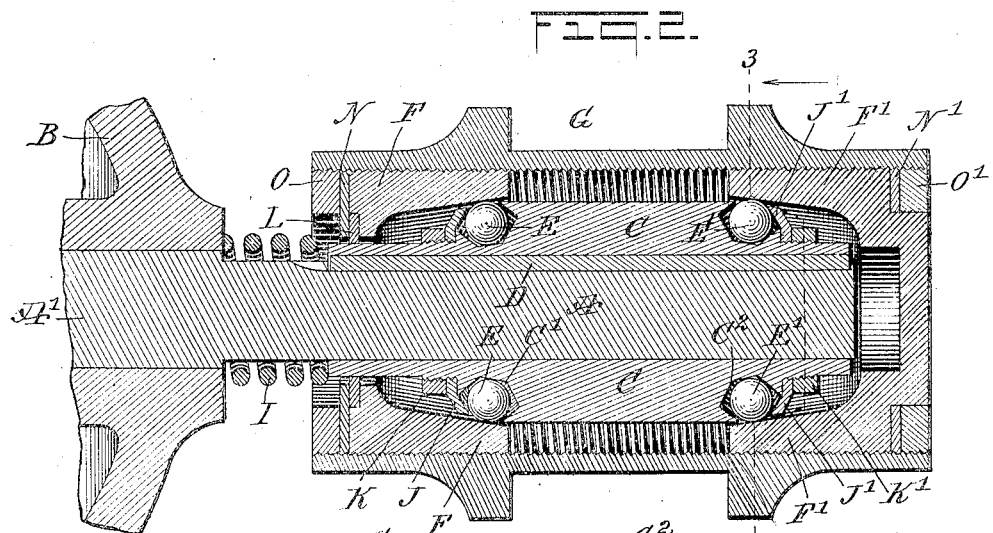
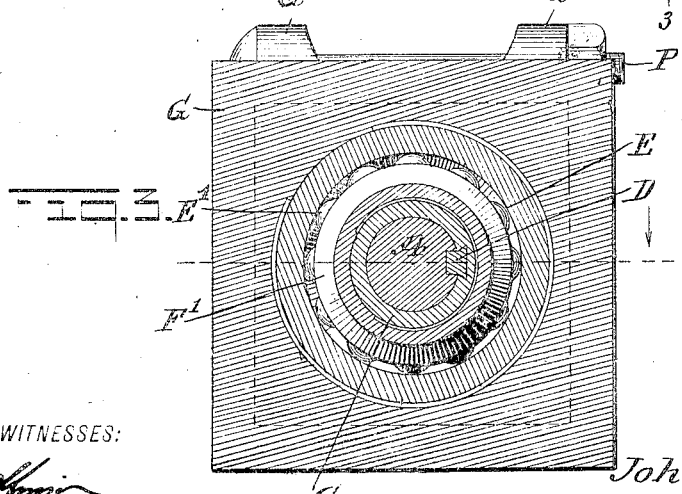
WITNESSES:
INVENTOR
John N. Petersen
BY
ATTORNEYS

UNITED STATES PATENT OFFICE.

JOHN NICHOLAS PETERSEN, OF NEW ORLEANS, LOUISIANA, ASSIGNOR OF ONE-HALF TO WILLIAM F. PETTIT, OF NEW ORLEANS, LOUISIANA.

BALL-BEARING.

No. 821,057.     Specification of Letters Patent.     Patented May 22, 1906.

Application filed July 9, 1904. Serial No. 215,856.

*To all whom it may concern:*

Be it known that I, JOHN NICHOLAS PETERSEN, a citizen of the United States, and a resident of New Orleans, in the parish of Orleans and State of Louisiana, have invented a new and Improved Ball-Bearing, of which the following is a full, clear, and exact description.

The object of the invention is to provide a new and improved ball-bearing arranged to relieve the bearing of jars and jolts incident to end thrust, to prevent jamming or crowding of the balls by allowing sidewise play thereof, to render the bearing dust-proof and oil-retaining, and in case the bearing is applied to rolling-stock of railroads to lessen the friction of the wheel-flanges against the outer rail when running around sharp curves.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied to a car-axle. Fig. 2 is an enlarged sectional plan view of the same, and Fig. 3 is a cross-section of the same.

On the journal A of a car-axle A', carrying a car-wheel B, is loosely fitted a sleeve C, mounted to turn with and to slide lengthwise on the journal A, the latter being for this purpose provided with a longitudinal groove or keyway into which fits a key D, secured to the sleeve C. The sleeve C is provided with spaced annular raceways C' and C², containing sets of balls E and E', respectively, engaged at their outer points by the inner walls or faces of cups F and F', screwing lengthwise in a journal box or casing G, mounted to slide up and down in the usual manner in the bearings of the truck.

The bottom walls of the annular races C' and C² are inclined approximately parallel to the corresponding faces of the cups F and F', and the races are sufficiently broad to allow sidewise play of the balls to prevent jamming or crowding of the balls.

The sleeve C is pressed on at its inner end by one end of a spring I, coiled on the axle and abutting against the hub of the car-wheel B, so as to exert an outward pressure against the sleeve C, and hence when the car is rounding a sharp curve the friction of the car-wheel flanges against the outer rail is lessened to a considerable degree, as the spring I allows the sleeve C to yield—that is, to shift its position lengthwise within the box or casing G.

In order to retain the sets of balls E and E' in their races C' and C², retaining-rings J and J' are provided, screwing on the corresponding ends of the sleeve C and held in position by jam-nuts K and K', likewise screwing on the said sleeve.

The outermost cup F' is closed, as plainly indicated in Fig. 2, while the innermost cup F is provided with a central aperture for the passage of the inner end of the sleeve C, and on this inner cup F is held a dust-ring L, made of leather, rubber, or other suitable material, fitting with its inner wall the peripheral face of the sleeve C, so as to render the bearing dust-proof and oil-retaining. The dust-ring L is held in place by a metallic washer N, fitting against the end of the cup F and held in place by a ring-shaped nut O, screwing in the inner end of the box G. By this arrangement the cup F is secured in place after the cup is adjusted, and a similar washer N' and nut O' engage the cup F' to hold the latter in position after the cup is screwed into the desired position within the box or casing G.

If desired, additional fastening devices for the cups F and F' may be employed—for instance, as shown in the drawings, two screw-rods P and P' may be used, each extending through lugs G' and G², formed or secured exteriorly on the box or casing G, so that when the nuts of the screw-rods P P' are screwed up the box tends to clamp the cups F and F' in place to prevent accidental movement thereof within the box or casing G.

It is understood that the box or casing is slotted or grooved to render the metal very thin between the lugs G' G² for the screw-rods P P' to compress the casing sufficiently to clamp the cups F F' in place.

Having thus described my invention, I claim as new and desire to secure by Letters Patent—

1. A ball-bearing, comprising a longitudinally-grooved journal, a sleeve having a key fitting in the groove of the journal and provided with spaced annular raceways, balls in each of the raceways, a spring pressing the sleeve in the direction of its length, a box, a cup screwing into each end of the box and engaging with its inner face the balls, the outer cup being closed and the inner one having an opening to receive the sleeve, means for locking the cups in position, and a dust-ring secured to the outer end of the inner cup and fitting the peripheral face of the sleeve.

2. A ball-bearing, comprising a journal, a spring-pressed sleeve having sliding and guided movement on the journal, said sleeve being provided with spaced annular raceways, balls in the raceways, a box, a cup secured in each end of the box and engaging the balls, the outer cup being closed and the inner one having an opening to receive the sleeve, means for locking the cups in position, and a dust-ring secured to the inner cup and fitting upon the sleeve.

3. A ball-bearing, comprising a box, a journal, a sliding and spring-pressed sleeve on the journal, said sleeve being provided with spaced annular raceways, balls in the raceways, and cups secured in the ends of the box and engaging the balls.

4. In a ball-bearing, a box, a journal, a sliding and spring-pressed sleeve on the journal, said sleeve having spaced raceways, each formed by an annular groove and a ring secured to the sleeve adjacent to the groove, balls in the raceways, and a cup secured in each end of the box and engaging the balls.

5. In a ball-bearing, a box, a journal, a sliding and spring-pressed sleeve on the journal, said sleeve being provided with spaced annular raceways, balls in the raceways, cups secured in the ends of the box and engaging the balls, a dust-ring fitting upon the inner end of the sleeve, a washer engaging the dust-ring and end of the inner cup, and a ring-nut screwing into the box into engagement with the washer.

6. In a ball-bearing, a box, a journal, a spring-pressed sleeve having sliding and guided movement on the journal, said sleeve being provided with spaced annular raceways, balls in the raceways, cups screwing into the ends of the box and engaging the balls, and means for locking the cups in position after they have been adjusted.

In testimony whereof I have signed my name to this specification in the presence of two subscribing witnesses.

JOHN NICHOLAS PETERSEN.

Witnesses:
W. F. PETTIT, Jr.,
A. PETTIT.